United States Patent
Kordasiewicz et al.

(10) Patent No.: US 10,075,349 B2
(45) Date of Patent: *Sep. 11, 2018

(54) SYSTEMS AND METHODS FOR MODELING QUALITY OF SERVICE FOR STREAMING MEDIA

(71) Applicant: NetScout Systems Texas, LLC, Plano, TX (US)

(72) Inventors: Roman Kordasiewicz, Elmira (CA); Hojatollah Yeganeh, Kitchener (CA)

(73) Assignee: NetScout Systems Texas, LLC, Plano, TX (US)

( * ) Notice: Subject to any disclaimer, the term of this patent is extended or adjusted under 35 U.S.C. 154(b) by 166 days.

This patent is subject to a terminal disclaimer.

(21) Appl. No.: 14/531,391

(22) Filed: Nov. 3, 2014

(65) Prior Publication Data

US 2015/0052246 A1 Feb. 19, 2015

Related U.S. Application Data

(63) Continuation-in-part of application No. 13/053,650, filed on Mar. 22, 2011, now Pat. No. 9,178,633.

(Continued)

(51) Int. Cl.
*G06F 15/173* (2006.01)
*H04L 12/24* (2006.01)
(Continued)

(52) U.S. Cl.
CPC ......... *H04L 41/5067* (2013.01); *H04H 60/29* (2013.01); *H04H 60/64* (2013.01);
(Continued)

(58) Field of Classification Search
CPC ............... H04L 41/5067; H04L 65/80; H04N 21/64723; H04N 21/6473;
(Continued)

(56) References Cited

U.S. PATENT DOCUMENTS 7,647,614 B2 12/2010 Krikorian et al.
2005/0089043 A1 4/2005 Seckin et al.
(Continued)

OTHER PUBLICATIONS

Li, QoE-Based Performance Evaluation for Adaptive Media Playout Systems, Hindawi Publishing.*

(Continued)

*Primary Examiner* — Moustafa M Meky
*Assistant Examiner* — Kidest Mendaye
(74) *Attorney, Agent, or Firm* — Locke Lord LLP; Scott D. Wofsy; Christopher J. Capelli

(57) ABSTRACT

A monitoring device includes a video buffer model and a user model. The video buffer model monitors a media program streaming across a network to a media client for perceivable transmission impairments. The user model reflects user dissatisfaction due to types of perceivable transmission impairments and timing, duration, and frequency of perceivable transmission impairments so as to estimate a quality of experience of the media program. The parametric model can include one or more parameterized functions, and a set of parameters used in at least one of the one or more of the parameterized functions at a point in time during the streaming of the media program can be based on a type of perceivable transmission impairment associated with the point in time.

6 Claims, 6 Drawing Sheets

Related U.S. Application Data

(60) Provisional application No. 61/904,595, filed on Nov. 15, 2013, provisional application No. 61/407,631, filed on Nov. 23, 2010.

(51) Int. Cl.

| | |
|---|---|
| *H04L 12/26* | (2006.01) |
| *H04N 21/647* | (2011.01) |
| *H04H 60/29* | (2008.01) |
| *H04H 60/64* | (2008.01) |
| *H04L 29/06* | (2006.01) |
| *H04N 17/00* | (2006.01) |
| *H04N 21/24* | (2011.01) |

(52) U.S. Cl.
CPC .......... *H04L 43/04* (2013.01); *H04L 65/4084* (2013.01); *H04L 65/605* (2013.01); *H04L 65/80* (2013.01); *H04N 17/004* (2013.01); *H04N 21/2401* (2013.01); *H04N 21/6473* (2013.01); *H04N 21/64723* (2013.01); *H04N 21/64738* (2013.01)

(58) Field of Classification Search
CPC ......... H04N 21/64738; H04N 21/2401; H04N 17/004; H04H 60/29; H04H 60/64
See application file for complete search history.

(56) References Cited

U.S. PATENT DOCUMENTS

| | | | | |
|---|---|---|---|---|
| 2008/0155087 | A1* | 6/2008 | Blouin | H04L 43/0817 709/223 |
| 2009/0034426 | A1* | 2/2009 | Luft | H04L 12/2602 370/252 |
| 2013/0041998 | A1 | 2/2013 | Kordasiewicz | |

OTHER PUBLICATIONS

Tan et. al, Perceived Video Streaming Quality under Initial Buffering and Rebuffering Degradations, 2006, MESAQIN (researchgate.net).*
Talukder et al. "Haar Wavelet Base Approch for Image Compression and Quality Assessment of Compressed Image", Feb. 1, 2007.*
European Search Report correlating to EP11835389 dated Jun. 4, 2014, 6 pages.
Jorgen Gustafsson et al., "Measuring Multimedia Quality in Mobile Networks with an Objective Parametric Model", ICIP 2008, 15th IEEE International Conference, Oct. 12, 2008, 4 pages.
Jorgen Gustafsson Ericsson Research et al., "P.NBAMS ToR; 379 (GEN/12)", International Telecommunication Union, Study Period 2009-2012, Sep. 17, 2010, 19 pages.
Pascal Hubbe et al., "An Innovative Tool for Measuring Video Streaming QoE", Techzine, Jan. 12, 2011, 7 pages.
Xiangchun Tan et al., "Perceived Video Streaming Quality Under Initial Buffering and Rebuffering Degradations", MESAQIN Conference 2006, Jun. 5, 2006, 8 pages.
International Search Report for PCT/CA2011/001190, dated Jan. 20, 2012, 9 pages.
Brooks et al., "User Measures of Quality of Experience: Why Being Objective and Quantitative is Important", IEEE Network, p. 8-13, Apr. 1, 2010.
Batteram et al., "Delivering Quality if Experience in Multimedia Networks", Bell Labs Technical Journal, vol. 15, No. 1, p. 175-193, Jun. 1, 2010.
Anonymous, "Video Streaming Quality Measurement with VSQI", Technical Paper, May 14, 2009, 14 pages.
"Cisco Visual Networking Index: Global Mobile Data Traffic Forecast Update, 2012-2017", CISCO, Feb. 6, 2013, 34 pages.
YouTube Statistics, Accessed Feb. 27, 2015, 1 page. <http://www.youtube.com/yt/press/statistics.html>.

"Methodology for the Subjective Assessment of the Quality of Television Pictures", ITU-R Rec. BT.500, Revision 13, International Telecommunications Union, Jan. 1, 2012, 48 pages.
"Subjective Video Quality Assessment Methods for Multimedia Applications", ITU-T Rec. P.910, Revision 3, International Telecommunications Union, Sep. 1, 1999, 37 pages.
Markus Fiedler et al., "A Generic Quantitative Relationship Between Quality of Experience and Quality of Service", IEEE Network, Mar. 1, 2010, 7 pages.
Tobias Hossfeld et al., "Quantification of YouTube QoE via Crowdsourcing", 2011 IEEE Symposium on Multimedia (ISM), Dec. 5-7, 2011, 6 pages.
Tobias Hossfeld et al., "Initial Delay vs. Interruptions: Between the Devil and the Deep Blue Sea", QoMEX 2012, Jul. 5-7, 2012, 6 pages.
S. Shunmuga Krishnan et al., "Video stream quality impacts viewer behavior: inferring causality using quasi-experimental designs", Proceedings of the 2012 ACM Conference on Internet Measurement, Nov. 14-16, 2012, 14 pages.
Toon De Pessemier et al., "Quantifying the influence of rebuffering interruptions on the user's quality of experience during mobile video watching", IEEE Transactions on Broadcasting, vol. 59, No. 1, Mar. 1, 2013, 15 pages.
Florin Dobrian et al., "Understanding the impact of video quality on user engagement", ACM SIGCOMM 2011, Aug. 15, 2011, 9 pages.
Alan Conrad Bovik, "Automatic prediction of perceptual image and video quality", Proceedings of the IEEE, vol. 101, No. 9, Sep. 1, 2013, 17 pages.
Vlado Menkovski et al., "QoE for Mobile Streaming", Mobile Multimedia-user and Technology Perspectives, Jan. 20, 2012, 19 pages.
Ricky K. P. Mok et al., "Measuring the Quality of Experience of http Video Streaming", IFIP/IEEE International Symposium on Integrated Network Management, May 1, 2011, 8 pages.
Wei Song et al., "Understanding User Experience of Mobile Video: framework, measurement, and optimization", Mobile Multimedia: User and Technology Perspectives, Jan. 20, 2012, 29 pages.
Anush Krishna Moorthy et al., "Video quality assessment on mobile devices: subjective, behavioral and objective studies", IEEE Journal of Selected Topics in Signal Processing, vol. 6, No. 6, Dec. 6, 2012, 20 pages.
Toon De Pessemier et al., "Quantifying Subjective Quality Evaluations for Mobile Video Watching in a Semi-living Lab Context", IEEE Transactions on Broadcasting, Dec. 1, 2012, 10 pages.
Kalpana Seshadrinathan et al., "Study of Subjective and Objective Quality Assessment of Video", IEEE Transactions on Image Processing, Feb. 2, 2010, 16 pages.
Satu Jumisko-Pyykko et al., "Evaluation of Subjective Video Quality of Mobile Devices", Proceedings of the 13th Annual ACM International Conference on Multimedia, Nov. 6-11, 2005, 4 pages.
Zhou Wang et al., "Objective Video Quality Assessment", Chapter 41, The Handbook of Video Databases: Design and Applications, Sep. 1, 2003, 38 pages.
Zhou Wang et al., "Video Quality Assessment Based on Structural Distortion Measurement", Signal Processing: Image Communication, vol. 19, No. 1, Jan. 1, 2004, 9 pages.
Athula Balachandran et al., "Developing a Predictive Model of Quality of Experience for Internet Video", Proceedings of the ACM SIGCOMM 2013 Conference on SIGCOMM, Aug. 12-16, 2013, 12 pages.
Tobias Hossfeld et al., "Internet Video Delivery in Youtube: From Traffic Measurements to Quality of Experience", Data Traffic Monitoring and Analysis, Mar. 1, 2013, pp. 266-303.
Selim Ickin et al., "Studying the challenges in assessing the perceived quality of mobile-phone based video", IEEE QoMEX 2012, Jul. 5-7, 2012, 7 pages.
"Avvasi DQS Model Description, Performance, Detailed Analysis, and Comparison wuith FTW Model", Avvasi Inc., Telecommunication Standardization Sector, International Telecommunication Union (ITU), Dec. 1, 2012.

(56) References Cited

OTHER PUBLICATIONS

Hojatollah Yeganeh et al., "Delivery Quality Score Model for Internet Video", 2014 IEEE International Conference on Image Processing (ICIP), Oct. 27-30, 2014, 5 pages.

* cited by examiner

SYSTEMS AND METHODS FOR MODELING QUALITY OF SERVICE FOR STREAMING MEDIA

CROSS-REFERENCE TO RELATED APPLICATIONS

The present application claims priority to U.S. Provisional Patent Application Ser. No. 61/904,595, entitled "METHOD FOR MODELING QUALITY OF SERVICE IN A VIDEO NETWORK" and filed on Nov. 15, 2013, the entirety of which is incorporated by reference herein.

The present application also claims priority to U.S. patent application Ser. No. 13/053,650, filed on Mar. 22, 2011 and entitled "DELIVERY QUALITY OF EXPERIENCE (QOE) IN A COMPUTER NETWORK", which in turn claims priority to provisional U.S. Patent Application Ser. No. 61/407,631 and filed on Oct. 28, 2010, the entireties of which are incorporated by reference herein.

BACKGROUND

Field of the Disclosure

The present disclosure relates generally to data networks, and more particularly to the identification, organization, tracking, and analysis of streaming media in a network.

Description of the Related Art

Streamed media, particularly video, represents an increasingly large percentage of the data delivered over the Internet and other networks. As the popularity of media streaming increases, network providers, content providers, and other service providers increasingly are evaluated by their customers based on their ability to deliver media at a high standard of quality. As such, it is ineffective to simply consider media as another category of traffic on a network, represented merely in standard network metrics, such as in gigabits per second; rather, it behooves service providers to obtain an accurate understanding of the customer's experience. Some efforts to evaluate quality measures for media focus on traditional sampling and coding impairments or on packet loss and associated spatiotemporal artifacts due to unreliable streaming. However, the vast majority of streaming media services are consumed over-the-top (OTT) via reliable streaming, obviating the value of such measures associated with unreliable streaming. Further, many of the existing efforts solely focus on objective measures, failing to take into account subjective data related to the customer's experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
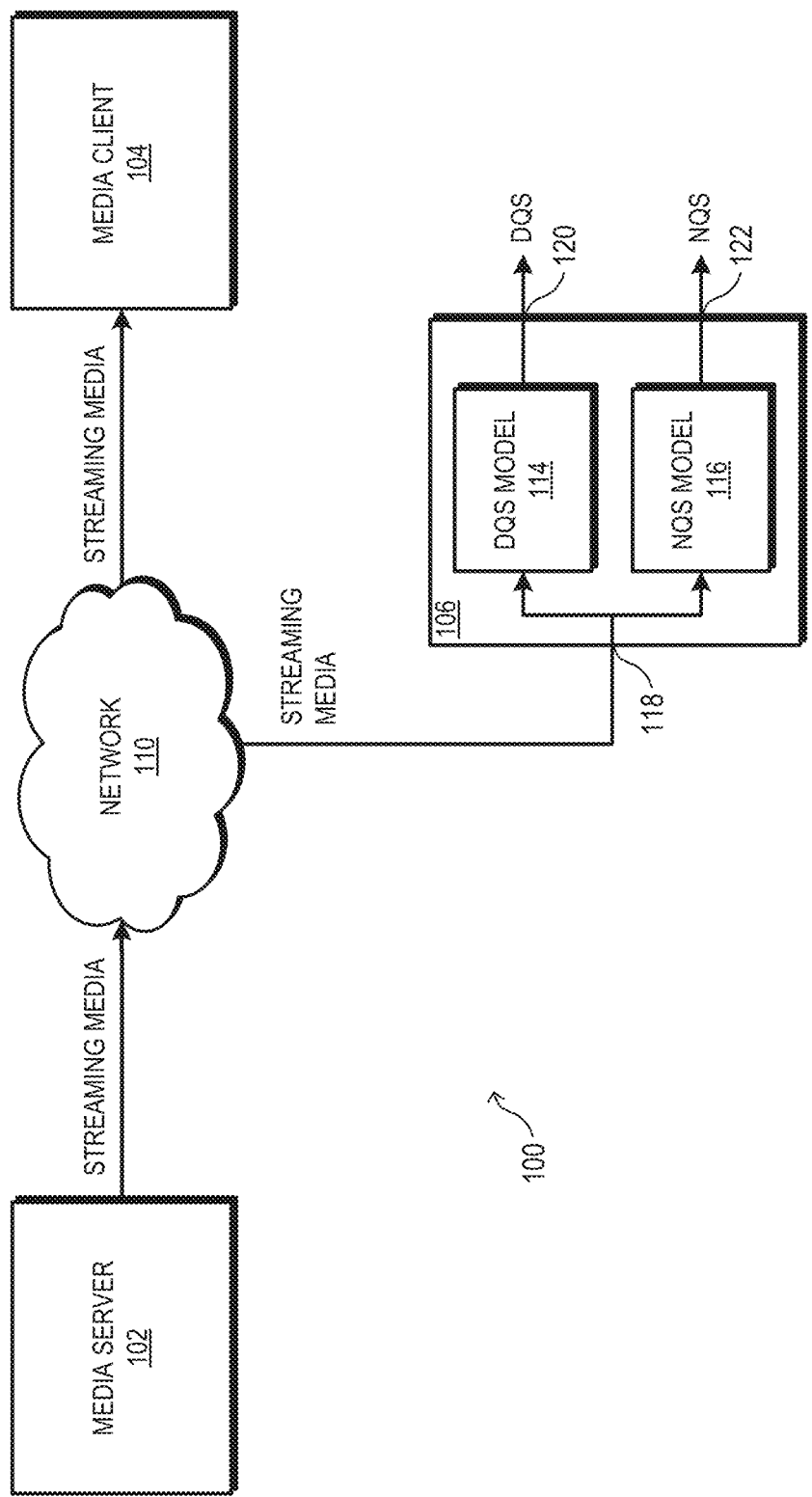
FIG. 1 is a block diagram illustrating a networked system in accordance with some embodiments.

FIGS. 1-6 illustrate example systems and techniques for estimating a Quality of Experience (QoE) of a media program streaming across a network to a media client based on a parameterized behavioral model to generate an objective delivery quality score (DQS) of a media session. In at least one embodiment, a network monitoring device monitors the media program for perceivable transmission impairments (e.g., an initial buffering, an initial rebuffering, or a subsequent rebuffering) as the media program is streaming across the network to the media client. The network monitoring device includes a user model that reflects user dissatisfaction due to the types of perceivable transmission impairments and duration between perceivable transmission impairments experienced during the streaming of the media program. The user model implements a state machine and a corresponding parameterized function to represent the user's QoE during the streaming of the media program, such that the user model represents a behavioral model of the user. Based on the parameterized function of the user model, the network monitoring device assesses all perceivable transmission impairments to estimate the QoE for the user and produce a DQS of the media program. In at least one embodiment, the parameterized function comprises a piecewise function implementing a linear subfunction and a raised cosine function, with which a multitude of DQS curves may be expressed by adjusting the parameters of these subfunctions, as well as the parameters used to select the applicable subfunction.

The user model selects values for the parameters in the parameterized function at a given point in time based on the types of perceivable transmission impairments and the durations between perceivable transmission impairments, which may be reflected by a state machine implemented by the user model to model transmission impairment events during streaming of the media program. The user model also may select the parameters further based on other inputs, such as the "user expectation context" for the streaming media program. This user expectation context reflects the user's likely expectations for quality given the media client device type (e.g., smart phone vs. tablet vs. set-top box), the network connection type (e.g., wired Ethernet vs. wireless local area network vs. cellular data network), the service type (that is, a source of the media program—for example, streaming provided by Netflix™ vs. streaming provided by YouTube™), the duration of the streaming media program, and the like. The selection of the values of the parameters based on these inputs allow the parameterized function to more accurately reflect that a user typically reacts differently to different perceivable transmission impairment types. For example, the parameters allow the user model to reflect greater user dissatisfaction due to an initial rebuffering than a subsequent rebuffering. Moreover, the input-based selection of parameter values allows the parameterized function to more accurately reflect that a user's negative reaction to a transmission impairment fades as playback resumes, as well as that a user typically has different expectations for a streaming multimedia program in one context, e.g., a short clip streamed over a cellular data network to a smart phone, than for a streaming multimedia program in another context, e.g., a feature length movie streamed over a wired Ethernet network to a set-top box.

FIG. 1 illustrates a networked system 100 in accordance with some embodiments. The network system 100 generally comprises a media server 102, a media client (or media player) 104, and a monitoring device 106 (e.g., a network monitoring device or a client-side monitoring device). The media server 102 presents media content (represented as a signal denoted as "STREAMING MEDIA") through a network 110. The network 110 may be implemented as a delivery network comprising numerous interconnected hardware and software-based systems through which streaming media travels. In some embodiments, the signal "STREAMING MEDIA" is presented to both the media client 104 and the monitoring device 106. QoE estimation is generally implemented in the network monitoring device 106 as media sessions (e.g., "STREAMING MEDIA") moving through the network 110 are monitored. In one example, the monitoring device 106 monitors traffic in Internet Protocol (IP) networks. However, the particular type of network may be varied to meet the design criteria of a particular implementation. While the monitoring device 106 is shown connected to the network 110, the monitoring device 105 may also be connected directly at the media server 102 or the media client 104.

In some embodiments, the monitoring device 106 inspects packets on network interfaces (e.g., the media client 104) being monitored. In some embodiments, the monitoring device 106 monitors for media sessions on the network 110. In yet other embodiments, the monitoring device 106 is integrated with the media client 104 and can monitor client events and the stream information but cannot monitor the packets. Once a media session is detected, the state of the media client 104 is generally estimated for the purpose of QoE estimation. The state information is based on how and when a particular session is started and how the media is delivered over the network 110. The state information is then used to either compute an estimate of an objective DQS or an objective network quality score (NQS). It will be appreciated that in implementations whereby the monitoring device 106 is integrated with the media client 104, the state of the media client 104 is known and thus does not need to be estimated.

The monitoring device 106 generally comprises a DQS model 114 and an NQS model 116. The monitoring device 106 has an input 118 to receive the signal "STREAMING MEDIA," an output 120 to present a signal denoted "DQS" and an output 122 to present a signal denoted "NQS." The signal "DQS" may be in a first format (e.g., as a mean opinion score (MOS) range of 1 to 5), while the signal "NQS" may be in a second format (e.g., as a percentage). The monitoring device 106 generates the signal "DQS" and the signal "NQS" in response to the signal "STREAMING MEDIA." In some embodiments, the monitoring device 106 generates the signal "DQS" individually, the signal "NQS" individually, or a combination of the signal "DQS" and the signal "NQS." The signal "DQS" or the signal "NQS" may be considered as signals expressing the impact of the delivery network on the end user QoE (e.g., quality of experience signal).

Figure 2:
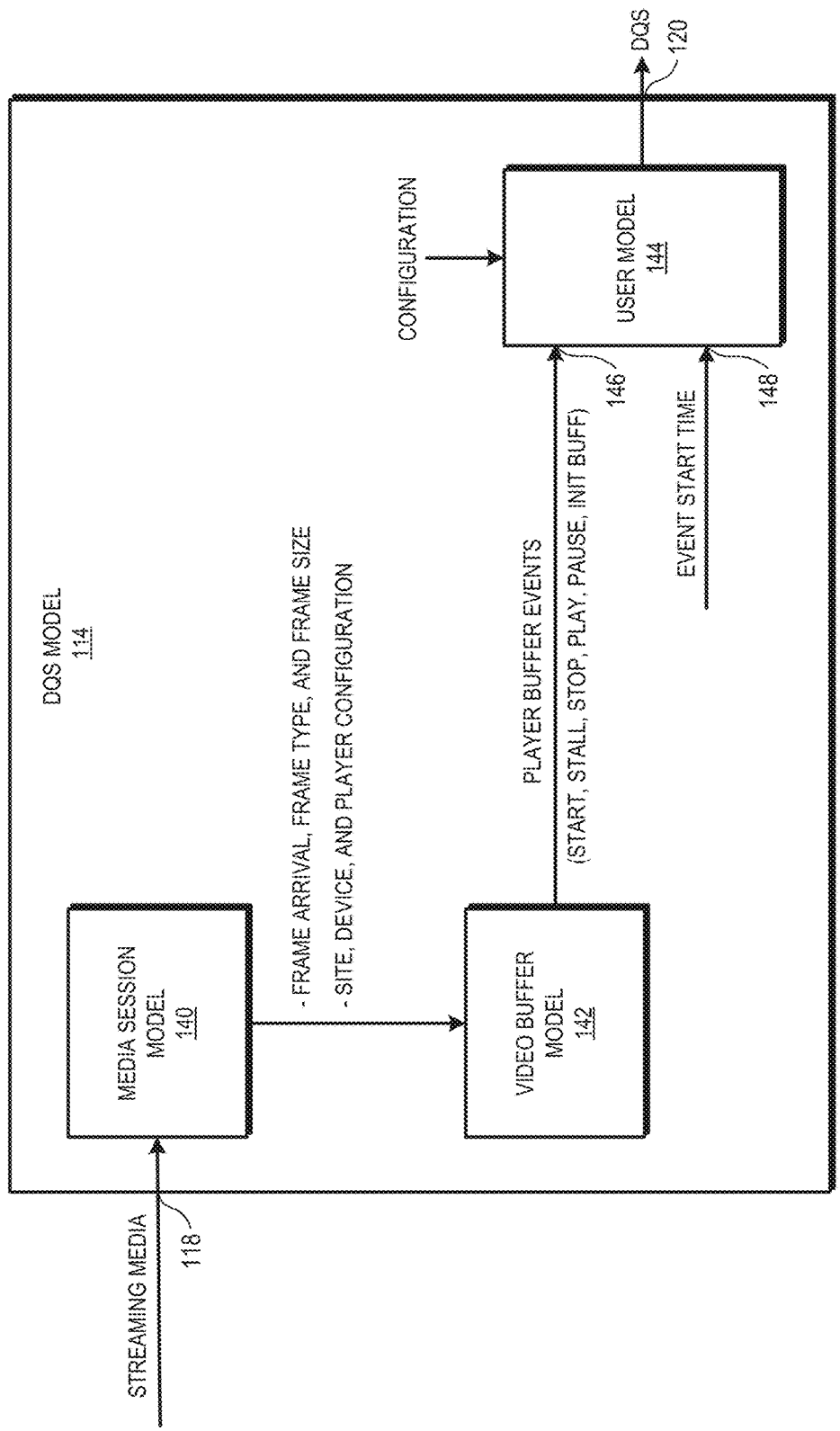
FIG. 2 is a diagram illustrating a delivery quality score (DQS) model for generation of an objective quality signal in accordance with some embodiments.

FIG. 2 illustrates the DQS model 114 of FIG. 1 generating a DQS data flow in accordance with some embodiments. The DQS model 114 generally comprises a media session model 140, a client playback model 142, and a user model 144. The DQS model 114 has an input 118 to receive the signal "STREAMING MEDIA" and an output 120 to present the signal "DQS." The DQS model 114 has an input 146 to receive a signal denoted "PLAYER BUFFER EVENTS" and a signal denoted "EVENT START TIMES" associated with the corresponding player buffer event, and an output 120 to present the signal "DQS."

The media session model 140 assembles the network traffic (e.g., packets), track frame arrivals at the media client 104, detect site, device, player information, the start and end of media sessions, and the like, and detect audio or video frames, including frame type, frame size, or a combination thereof. The client playback model 142 may use all or part of the information from the media session model 140 to estimate the playback state of the media client 104. The estimation may be presented as an event indicator in the signal "PLAYER BUFFER EVENTS." The events may include, but are not limited to, a START event, a STOP event, a PLAY event, a PAUSE event, a SEEK event, a STALL event, an initialize buffer (INIT BUFF) event, and the like. The state (event) information is then used by the user model 144 to compute a value for the signal "DQS". In some embodiments, the signal "DQS" is a unique signal that is computed for each media session. In some embodiments, the value of the signal "DQS" is sampled throughout the media session. A value of the signal "DQS" is then stored to an external system, such as a memory, disk drive, or other storage device (not shown).

The user model 144 computes an objective quality score that represents an estimation of a user experience of streaming media as affected by perceivable transmission impairments. The signal "DQS" is an estimate of an objective score based on input from the client playback model 142. In some implementations, the objective score is based on an estimate of an actual video buffer within the media client 104 (when the monitoring device 106 is implemented in the network) or based on an actual knowledge of the video buffer within the media client 104 (when the monitoring device 106 is implemented in the media client 104).

The DQS model 114 may be implemented entirely in hard-coded logic (that is, hardware), as a combination of software stored in a non-transitory computer readable medium (e.g., memory, hard drive, or optical disc storage) and one or more processors to access and execute the software, or as a combination of hard-coded logic and software-executed functionality. To illustrate, in one embodiment, the monitoring device 106 is implemented as a system on a chip (SOC) whereby portions of the DQS model 114 and the NQS model 116 are implemented as hardware logic, and other portions are implemented via firmware stored at the SOC and executed by a processor of the SOC.

In some embodiments, the hardware of the monitoring device 106 may be implemented using a single processing device or a plurality of processing devices. Such processing devices can include a central processing unit (CPU), a graphics processing unit (GPU), a microcontroller, a digital signal processor, a field programmable gate array, programmable logic device, state machine, logic circuitry, analog circuitry, digital circuitry, or any device that manipulates signals (analog or digital) based on operational instructions that are stored in a memory. The memory may be a single memory device or a plurality of memory devices. Such memory devices can include a hard disk drive or other disk drive, read-only memory, random access memory, volatile memory, non-volatile memory, static memory, dynamic memory, flash memory, cache memory, or any device that stores digital information. Note that when the processing module implements one or more of its functions via a state machine, analog circuitry, digital circuitry or logic circuitry, the memory storing the corresponding operational instructions may be embedded within, or external to, the circuitry comprising the state machine, analog circuitry, digital circuitry, or logic circuitry.

Figure 3:
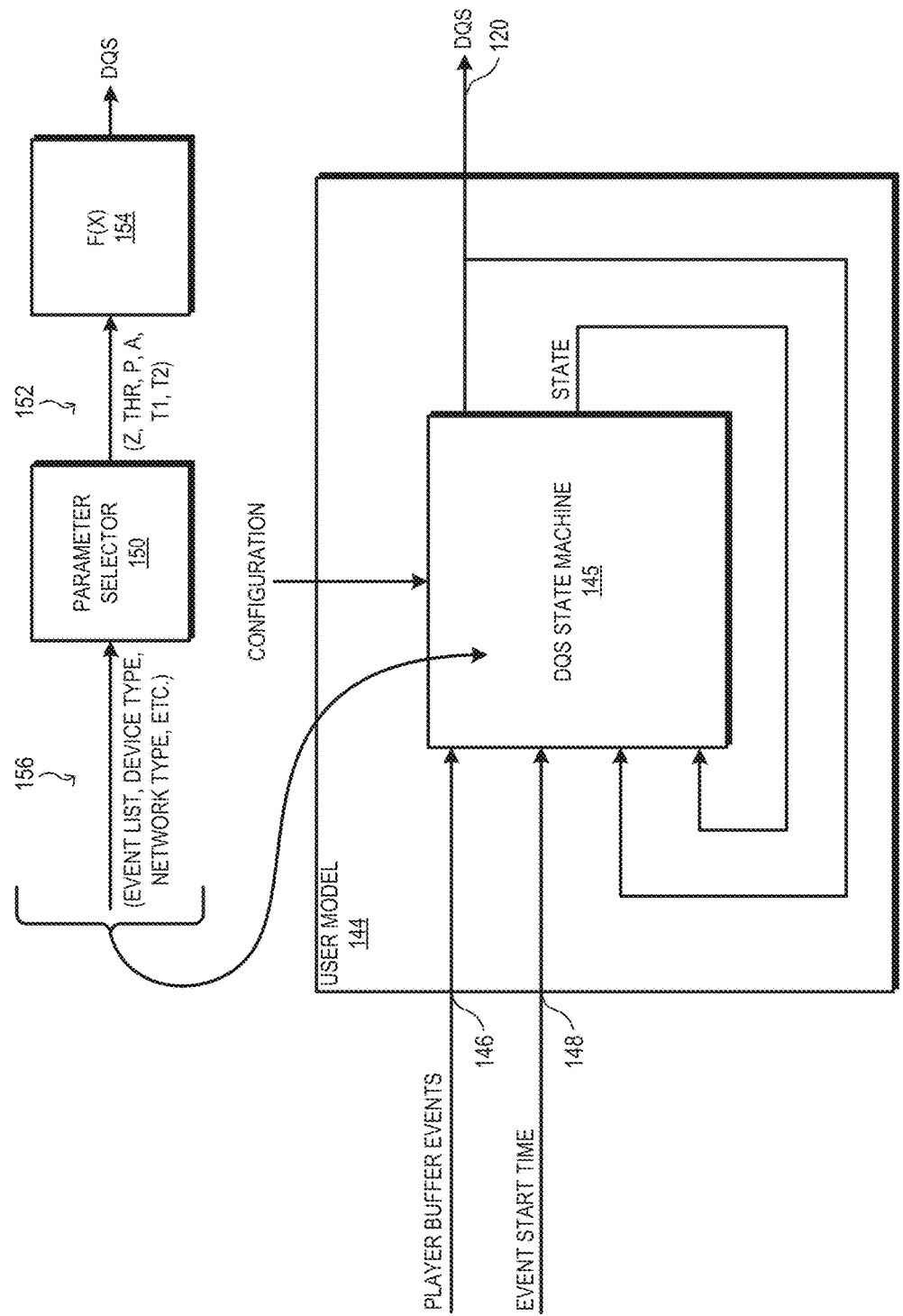
FIG. 3 is a diagram illustrating an example of a user model of the DQS model of FIG. 2 in accordance with some embodiments.

FIG. 3 illustrates an example of the user model 144 of FIG. 2 comprising a state machine 145 in accordance with some embodiments. The state machine 145 generates the signal "DQS" in response to the signal "PLAYER BUFFER EVENTS," and the signal "EVENT START TIME." The state machine 145 generates a signal "STATE" that may be presented as feedback. The signal "STATE" indicates a current state of the state machine 145. The signal "DQS" may also be presented as feedback. The state machine 145 adjusts the current value in the signal "DQS" based on the previous value feedback (that is, the "current score") in the signal "DQS."

The state machine 145 implements a parameterized function 154 used to produce the DQS values for the signal "DQS." The parameterized function 154 represents the user's QoE during a perceivable transmission impairment and the streaming of the media program as a whole, such that the parameterized function 154 serves as a behavioral model of the user. Thus, the parameterized function 154 reflects that user satisfaction decreases during perceivable transmission impairments and increases during uninterrupted playback, as a function of time. To this end, in at least one embodiment, the parameterized function 154 comprises a piecewise function comprising a plurality of subfunctions, including a cosine subfunction and a linear subfunction. Further, in at least one embodiment, parameters of the parameterized function 154 may be selected so as to represent the user's experience during a period in which the perceivable transmission event is ongoing (referred to herein as the "frustration period") or to represent the user's experience as playback progresses following the perceivable transmission event (referred to herein as the "recovery period").

For example, in at least one embodiment, the parameterized function 154 comprises Equation 1 (EQ. 1), Equation 2 (EQ. 2), and Equation 3 (EQ. 3):

$$f(t) = \begin{cases} f(t-1) & t < T_1 \\ f(t-1) + z\frac{a}{2}\left[1 + \cos\left(\frac{P(t-T_2)}{T_2-T_1}\right)\right] & T_1 \le t \le T_2 \\ f(t-1) + z(1 + m \times (t-T_2)) & t > T_2 \end{cases} \quad \text{EQ. 1}$$

$$m = \frac{f(t-1) - 1 - a}{Thr - T_2} \quad \text{EQ. 2}$$

$$m = \frac{5 - f(t-1) - a}{Thr - T_2} \quad \text{EQ. 3}$$

where f(t) represents a current score for signal DQS at point in time t, that is, an estimate of the QoE at time t, and parameters z, P, T1, T2, a, and Thr together comprise the parameters 152, the values of which are selected by a parameter selector 150 based on a plurality of inputs 156 as described below. The parameter selector 150 selects values for the parameters 152 that reflect the user's behavior in response to perceivable transmission impairments. Specifically, the parameter selector 150 selects values for the parameters 152 that differentiate between perceivable transmission impairments of the initial buffering type and perceivable transmission impairments of the rebuffering type, where the initial buffering type comprises a delay occurring prior to initial playback of the media program, and the rebuffering type comprises a delay occurring after initial playback of the media program has begun. Generally, the parameter selector 150 selects values for the parameters 152 such that the DQS output of the parameterized function 154 reflects greater user dissatisfaction due to a perceivable transmission impairment of the rebuffering type than for a perceivable transmission impairment of the initial buffering type. Further, in at least one embodiment, the parameter selector 150 selects values for the parameters 152 to differentiate between different events of the rebuffering type. For example, in at least one embodiment, perceivable transmission impairments of the rebuffering type may comprise an initial rebuffering or a subsequent rebuffering. In such an embodiment, the parameter selector 150 further selects values for the parameters 152 such that the DQS output of the parameterized function 154 reflects greater user dissatisfaction due to a subsequent rebuffering event than to an initial buffering event.

The parameter P may be a constant, such as pi (π), or a value selected based on the inputs 156 as with the parameters z, T1, T2, a, and Thr. In at least one embodiment, the signal DQS emulates a MOS score, and thus is bounded to the range 1 to 5. It can be seen from Equation 1 that the DQS signal (f(t)) monotonically decreases when the parameter z is negative and there is no lower bound defined for this function. Thus, with the additional assumption that the DQS is set to "1" when t>=Thr when modeling during a perceivable transmission event yields Equation 2, which is used to set the value of parameter "m" for the f(t) following a perceivable transmission event. Conversely, it can be seen from Equation 1 that the DQS signal (f(t)) monotonically increases when the parameter z is positive and there is no upper bound defined for this function. Accordingly, with the assumption that the DQS is set to "5" when t>=Thr when modeling during a recovery period yields Equation 3, which is used to set the value of parameter "m" for the f(t) following during the recovery period. As such, the parameterized function 154 can be implemented to produce an estimate DQS between 1 and 5 at all times. However, other implementations may utilize different variations of Equation 2 and Equation 3, or otherwise impose different limits to fit different DQS ranges, and some embodiments may not impose limits on the resulting value at all. Further, in some embodiments, the parameterized function 154 comprises more or fewer subfunctions than the described example.

Generally, the parameter T1 may be understood to represent the delay between the occurrence of a perceivable transmission impairment and the user's recognition that the transmission impairment has occurred, or the amount of delay expected by the user, such that the user's QoE is unaffected by the delay for that period of time. The user's immediate reaction to recognition of the player buffer event is represented by the raised cosine subfunction, and thus parameter T2 generally may be understood to represent the latter bound of this initial reaction, and parameter "a" represents the slope, or "magnitude" of this reaction during the initial reaction period. The value for parameter z controls whether f(t) increase or decreases with the raised cosine subfunction, and thus a negative value (e.g., −1) is selected when in the frustration period at time t and a positive value (e.g., +1) is selected when in the recovery period at time t. The parameter Thr generally is selected to alter the slope of the linear subfunction of the above-identified piecewise function in Equation 1. However, in some embodiments the slope m of Equation 1 is also a parameter, the value of which may be calculated or selected by the parameter selector 150. In such embodiments, parameter Thr may or may not be used.

The parameter selector 150 selects values for the parameters 152 based on a plurality of inputs 156 representing the current context of the media program streaming to the media client 104. These inputs 156 can include, but are not limited to, the type of transmission impairment (e.g., an initial buffering event, a rebuffering event, etc.), the duration since the last transmission impairment (e.g., duration of playback time between events), and the user expectation context, which reflects the user's likely expectation of streaming quality based on the device type of the media client 104, the service type of the service streaming the media program (e.g., the content provider), the duration of the media program, the network type (e.g., wired Ethernet vs. wireless local area network vs. vs. 3G cellular data network vs. LTE cellular data network) and the like. Thus, the inputs 156 may include, for example, current time, current score (that is, current DQS value as represented by f(t)), perceivable transmission impairment start time, recovery start time, perceivable transmission impairment type, device category, network connection type, service type, and the like.

In one implementation, the parameter selector 150 selects values for the parameters 152 based on current time, current score, event list, and expectation context, where the "current score" (current DQS value) and "event list" (perceivable transmission impairments) inputs are also functions of "current time," which is relative to the beginning of the media session. In this implementation, the "expectation context" input is used to adjust parameters 152 based on different user expectations given constant media session conditions. The "expectation context" input is a tuple consisting of device category, network connection type, and service, where "device category" is one of smart phone, tablet, personal computer (PC), set top box, and the like, the "network connection type" is one of wired, wireless, 3G, LTE, and the like, and "service type" is the content provider or streaming method, such as Netflix™, YouTube™, Hulu™, and the like. The "event list" input is a list of tuples consisting of event start time and event type, where "event type" is one of initial buffer, initial rebuffer, subsequent rebuffer, play, seek buffer, pause, quality change, end, and the like. From the "event list" input, it is possible to extract several important signals, for example, initial buffering duration, number of rebuffering events, cumulative play duration, cumulative buffering duration, previous play segment duration, and the like. The parameter selector 150 then uses the relevant inputs 156 to calculate or otherwise select appropriate values for parameters 152 for the parameterized function 154.

The parameter selector 150 may use the inputs 156 discussed above in a variety of ways to determine the appropriate values for parameters 152. For example, the parameter selector 150 may select either "−1" (negative one) or "1" (one) as the value of parameter z based on information from the "event list" input indicating whether time t is during a perceivable transmission impairment (i.e., frustration period) or during a recovery period following the perceivable transmission impairment, respectively. As another example, the parameter selector 150 may adjust the value of parameter T1 for a perceivable transmission impairment of the initial buffering type based on the "service type" input, to reflect that a user is less dissatisfied by an initial buffering for long form content such as a movie. As a result, if the "service type" is Netflix or another movie service, the parameter selector 150 may increase the value of the T1 parameter for an initial buffering event, such that the DQS will reflect a high score indicating a better QoE for the user. As another example, parameter selector 150 may select a value for parameter a based on the "network connection type" input, such that if the user is accustomed to less reliable internet connectivity, the parameter selector 150 may reduce or otherwise select a lower value for parameter "a", essentially decreasing the magnitude of the response to the event. Further, the parameter selector 150 may select values for parameter T1 based on "event type" input to reflect expected user reaction time. Example values chosen by the parameter selector 150 for the parameters 152 of the parameterized function 154 of Equation 1, Equation 2, and Equation 3 are shown in Table 1 below.

TABLE 1

| Parameters | Buffering Initial | Rebuffering | | Recovery | | |
| | | Initial | Subsequent | Initial Buffering | Initial Rebuffering | Subsequent Rebuffering |
| --- | --- | --- | --- | --- | --- | --- |
| T1 | 2 | 0 | 0 | 0 | 0 | 0 |
| T2 | 3 | 0 | 0 | 3 | 2 | 0 |
| a | 1.3 | 1.6 | 0.3 | 1.0 | 1.5 | 0.0 |
| Thr | 89 | 28 | 116 | 140 | 390 | 294 |
| z | −1 | −1 | −1 | 1 | 1 | 1 |

Figure 4:
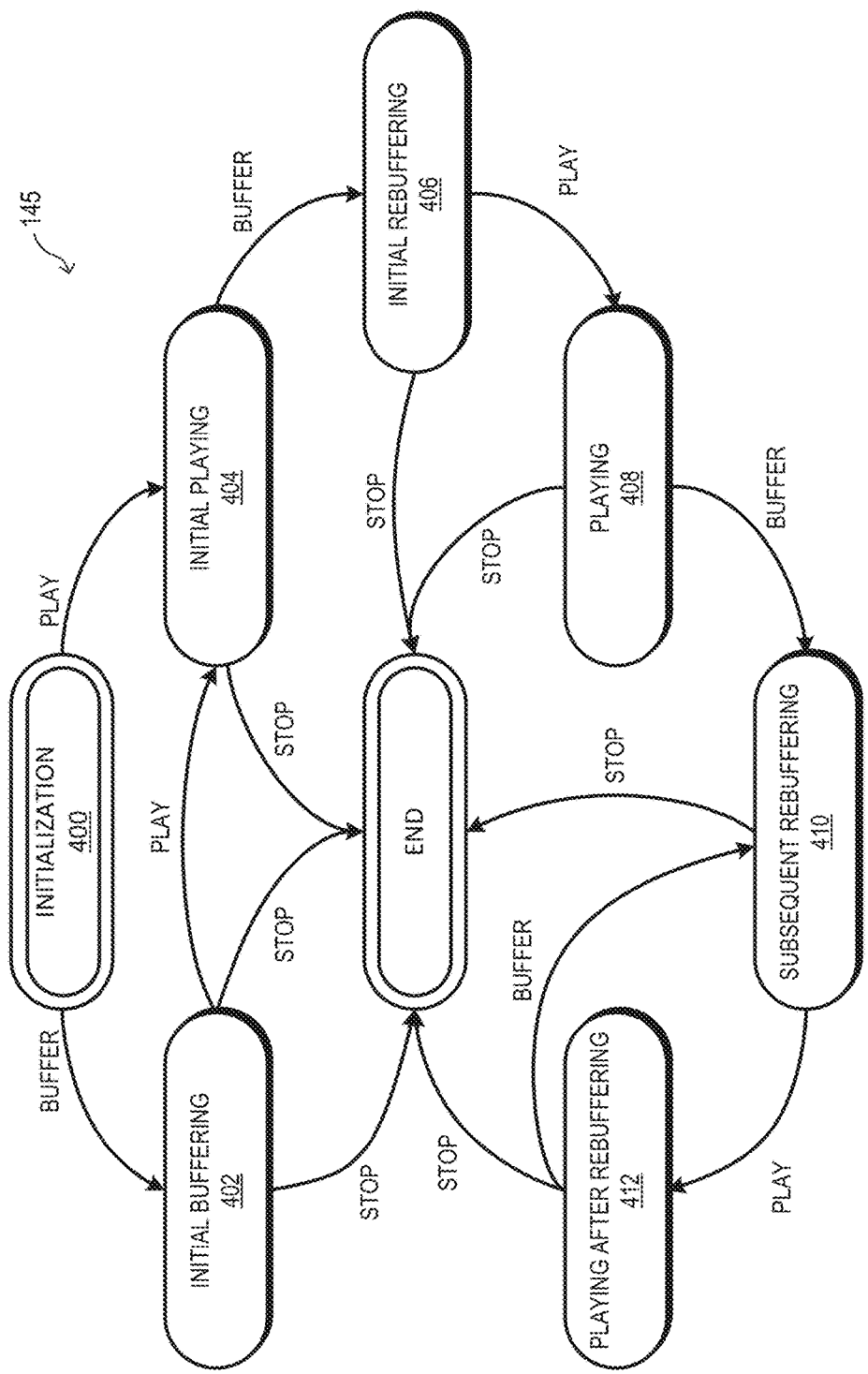
FIG. 4 is a diagram illustrating a state machine implementation of the user model of FIG. 3 in accordance with some embodiments.

FIG. 4 is a state diagram of the state machine 145 of the user model 144 of FIG. 3 in accordance with some embodiments. The state machine 145 generally comprises initialization state 400, initial buffering state 402, initial playing state 404, initial rebuffering state 406, playing state 408, subsequent rebuffering state 410, playing after rebuffering state 412, and end state 414. The state machine 145 may update periodically (e.g., once per second). At each of the updates, the state machine 145 may or may not change states depending on the current state and the information received with signals "PLAYER BUFFER EVENTS" and "EVENT START TIME." The state machine 145 may also update a satisfaction value (or level) in the signal "DQS" at each update.

At the initialization state 400, the streaming of a media program has begun as a result of assertion of a signal, for example, "SESSION START TIME." Thus, the state machine 145 transitions to the initial buffering state 402 and buffering of media content initiates. While the state machine 145 is in the initial buffering state 402, an initial buffering of the video or audio as received from the network 110 generally takes place in the media client 104. The buffering may be modeled by the client playback model 142. When sufficient media content has been buffered, the state machine 145 transitions to state 404 and playback of the media program begins.

The user generally expects that an initial delay (e.g., 3 seconds or less) may be experienced between the beginning of the stream and the appearance of the video or audio from the media client 104. If playback begins in less than T1 seconds after the event start time (T1 being a selected value), the DQS value remains unchanged according to Equation 1 above, and thus results in an unaltered or otherwise high satisfaction value in the signal "DQS". A high satisfaction value (e.g., 5) generally means that the user is satisfied or otherwise experiencing a good QoE. A low satisfaction value (e.g., 1) may indicate that the user is dissatisfied or otherwise experiencing a poor QoE.

Upon a playback event, a new event is signaled by event signal 146 and, in response, the user model 144 transitions to a different subfunction of the parameterized function 154 to calculate the DQS value for user satisfaction for the period of time between current EVENT_START_TIME and subsequent EVENT_START_TIME. In the example of Equation 1, the behavior model of the user is represented by a raised cosine function. From the initial buffering state 402, if the perceived transmission impairment ends and playback begins, the state machine 145 transitions to the initial playing state 404, and the DQS calculation is based on a recovery parameterized function 154 or recovery parameters 152. During the recovery period, the state machine 145 may increase the satisfaction value in the signal "DQS."

From the initial playing state 404, if the media program buffers again, the state machine 145 transitions to the initial rebuffering state 406. The additional delay may be perceived by the user as an unexpected delay. Therefore, the state machine 145 may reduce the satisfaction value in the signal "DQS" over time based on the parameterized function 154. Once playback of the media program returns, the state machine 145 transitions from the initial rebuffering state 406 to the playing state 408. The state machine 145 may increase the satisfaction value in the signal "DQS" based on the parameterized function 154 adapted for a recovery period. Further buffering transitions the state machine from the playing state 408 to the subsequent rebuffering state 410. Generally, a user experiences increased dissatisfaction with a subsequent rebuffering than for an initial rebuffering, or an initial buffering. The state machine 145 may reduce the satisfaction value in the signal "DQS" based on the parameterized function 154 to represent this increased dissatisfaction.

If the media program resumes playing, the state machine 145 transitions from the subsequent rebuffering state 410 to the playing after rebuffering state 412. During this recovery period following the perceivable transmission impairment, the parameterized function 154 represents a recovery period to correspond with the user's increased satisfaction as playback continues. As a result, the state machine 145 may increase the satisfaction value in the signal "DQS." Any further buffering causes the state machine 145 to transition back to the subsequent rebuffering state 410. The media session can have any number of buffering events, returning to the subsequent rebuffering state 410 any number of times. Generally user dissatisfaction increases with each subsequent rebuffering, and the state machine 145 may reduce the satisfaction value in the signal "DQS" accordingly.

The state machine 145 may transition from any of states 402-412 to the end state 414 if playback is stopped (not buffering or playing). The state machine 145 may transition to the end state 414 in response to the user stopping the media program, the media program completing playback, the media program's inability to play due to any of a variety of errors, or the like. In at least one embodiment, the state machine 145 reduces the satisfaction value in the signal "DQS" in response to transitioning to the end state 414 before the media program has completed playback to reflect a user's dissatisfaction resulting from a prematurely ended media program. In some embodiments, the state machine 145 may maintain the last DQS value calculated before the transition to the end state 414 as the final DQS value representative of the QoE of the media program. All transitions may be communicated by the client playback model 142 to the state machine 145 via one or more signals (e.g., "PLAYER BUFFER EVENTS").

Figure 5:
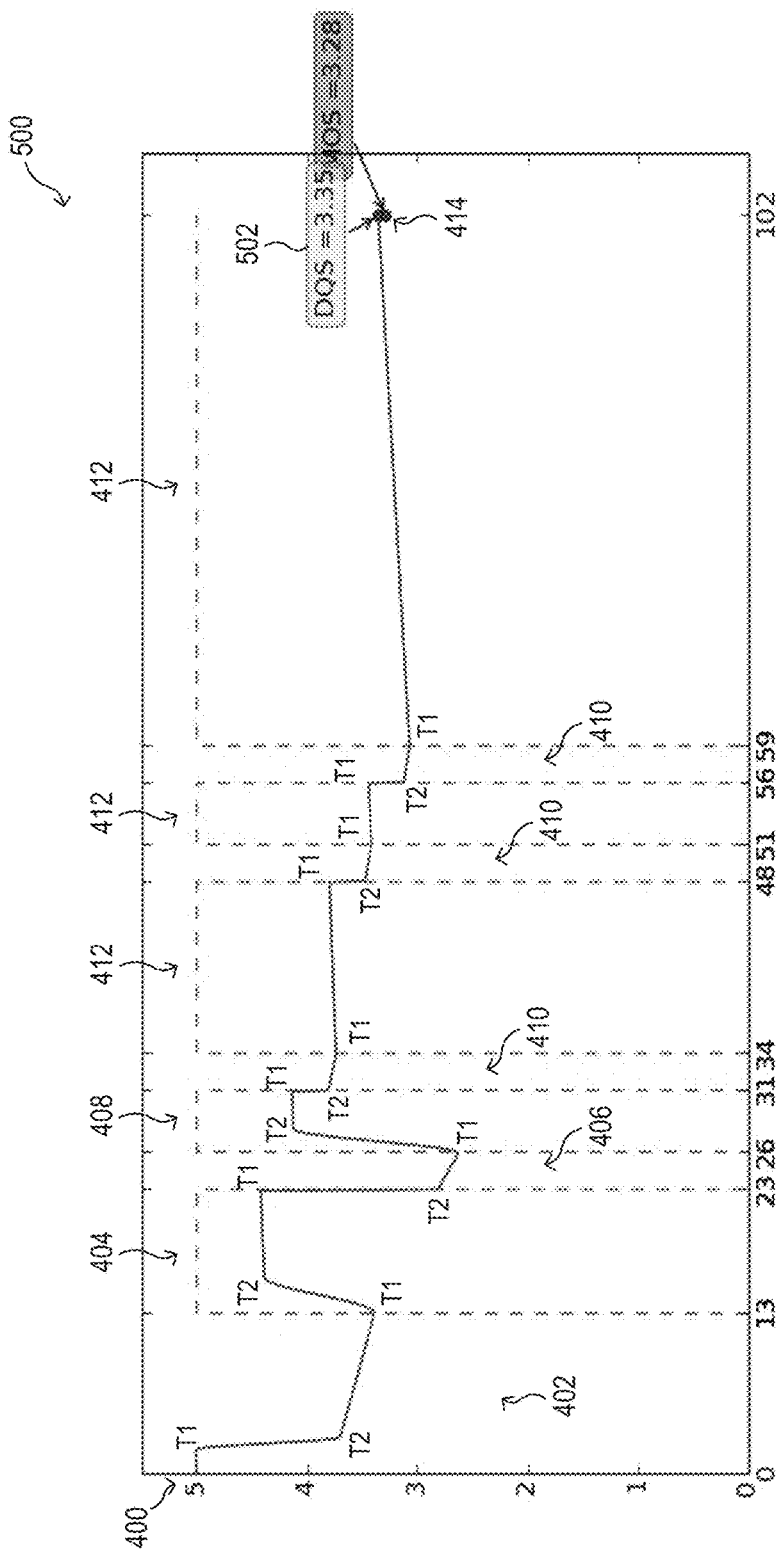
FIG. 5 is a graph illustrating a delivery quality score (DQS) output based on a rebuffering pattern example in accordance with some embodiments.

FIG. 5 is a graph 500 illustrating the DQS output 502 based on a rebuffering pattern comprising a long initial buffering event and four brief buffering events in the first half of the media program in accordance with some embodiments. For ease of description, the graph 500 is described with reference to the state machine 145 of FIG. 4. As illustrated, the media session initiates at 0 seconds and begins to buffer, such that the state machine 145 transitions from the initialization state 400 to the initial buffering state 402. The state machine 145 remains at the initial buffering state 402 until time t is equal to 13 seconds. The parameters T1 and T2 are indicated on the graph 500 for each state 402-412 to indicate when the user model 144 (FIG. 2) transitions through the subfunctions of the parameterized function 154 in the context of example Equation 1. While in the initial buffering state 402, the DQS indicates a value of "5" until t is equal to parameter T1. This delay could represent the user's expectation of an initial delay, the user's reaction time, or a combination of these.

Once playback returns at 13 seconds, the state machine 145 transitions to the initial playing state 404, and the DQS value is increased based on the parameterized function for recovery. The playback lasts 10 seconds before buffering again, at which time the state machine 145 transitions to the initial rebuffering state 406. Viewer satisfaction is related to how recent and how strong the perceived events are. As one simple example, a long period of uninterrupted playback after a start-up delay can completely relieve most/all prior frustration. In the illustrated example, the long initial buffering, and relatively short playback before an initial rebuffering results in significant user dissatisfaction.

The initial rebuffering lasts 3 seconds before playback resumes and the state machine 145 transitions to the playing state 408. The playback lasts 5 seconds before the media program buffers again, and the state machine 145 transitions to the subsequent rebuffering state 410. After 3 seconds, playback resumes and the state machine 145 transitions to the playing after rebuffering state 412. Playback continues for 14 seconds before the state machine transitions to the subsequent rebuffering state 410 again for 3 seconds, then the playing after rebuffering state 412 again for 5 seconds, then the subsequent rebuffering playing state again for 3 seconds, before finally transitioning to the playing after rebuffering state 412 again for 43 seconds. At the end of the 43 seconds, the media program is stopped and the state machine 145 transitions to the end state 414, computing a final DQS value of "3.35".

Figure 6:
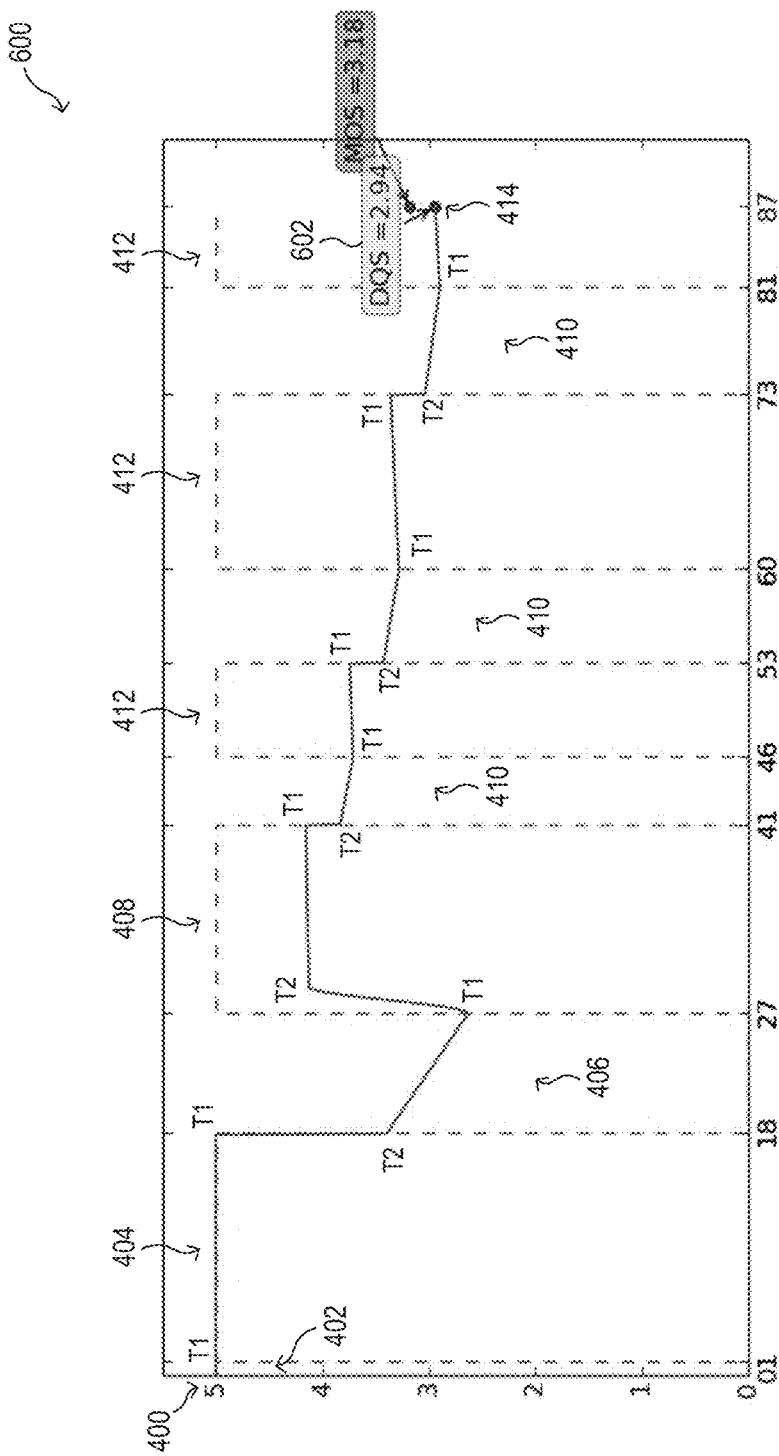
FIG. 6 is a graph illustrating a DQS output based on another rebuffering pattern example in accordance with some embodiments.

FIG. 6 is a graph 600 illustrating the DQS output 602 based on a rebuffering pattern comprising a minimal initial delay and four medium-length rebuffering events throughout the media program in accordance with some embodiments. For ease of description, the graph 600 is described with reference to the state machine 145 of FIG. 4. Further, the parameters "T1" and "T2" are indicated on the graph 500 for each state 402-412 to indicate when the user model 144 (FIG. 2) transitions through the subfunctions of the parameterized function 154 in the context of example Equations 1 and 2. As illustrated, the media session initiates at 0 seconds and begins to buffer, such that the state machine 145 transitions from the initialization state 400 to the initial buffering state 402. The initial buffering is very brief only lasting 1 second, such that the state machine 145 maintains the DQS value. Since users tend to expect some amount of initial delay, the brief initial buffering does not have any effect on the user's QoE before the state machine 145 transitions to the initial playing state 404. Since the DQS is already at the maximum value provided by the limits of the parameterized function 154 used (e.g., Equations 1 and 2), the DQS value remains unchanged. At 18 seconds, the media program buffers again, and the state machine transitions to the initial rebuffering state 406, where the state machine 145 decreases the DQS value based on the parameterized function 154.

The state machine 145 remains at the initial rebuffering state 406 for 9 seconds before transitioning to the playing state 408 due to the media program resuming playback. The DQS value increases during this recovery period according to the recovery parameters and the parameterized function 154. Playback continues for 14 seconds before buffering again, and the state machine 145 transitions to the subsequent rebuffering state 410 for 5 seconds. The state machine 145 transitions from the subsequent rebuffering state 410 to the playing after rebuffering state 412 for 7 seconds, back to the subsequent rebuffering state 410 for 7 seconds, back to the playing after rebuffering state 412 for 13 seconds, back to the subsequent rebuffering state 410 for 8 seconds, back to the playing after rebuffering state 412 for 6 seconds until the media program is stopped at 87 seconds. The state machine 145 transitions to the end state 414, computing a final DQS value of "3.18". In at least one embodiment, the DQS score would have benefited from the delays being distributed such that the user experienced a longer initial buffering, and less subsequent rebuffering, since the behavioral model results in less of a penalty for initial buffering delay than for initial rebuffering delay or subsequent rebuffering delay.

When the input signal 146 signals one of a "seek" or "pause" event, the user model 144 should ensure that the output signal 120 remains valid. In the preferred embodiment if a "seek" occurred the state machine would transition from any of current states into the initial rebuffering state 406 using its parametric function. This approximates the user expectation that in case of a seek event the user expects the video to start playing as the user would at the start of the session. In general, the user expectations after performing a seek can be quite different just as are the reasons for the user doing the seek. These expectations can be estimated based on state (playing, rebuffering, initial buffering, etc.) the type of service, duration of video, the number of seeks, the number of prior rebuffering events, and other signals. This information can be used to adjust the parameters of the parameterized function, In at least one embodiment, if a "pause" event is signaled to the user model, the user model holds its value from just before the pause until the pause is finished. This can be accomplished by setting parameter z in eq. 1 to 0. In general, the DQS value will change during pausing, based on state (playing, rebuffering, initial buffering etc.), the type of service, duration of video, the number of seeks, the number of prior rebuffering events, other signals, or the like.

While the networked system 100 (FIG. 1) and its components have been described with reference to particular embodiments, the techniques described herein can be applied to any of a variety of use cases. That is, the parameterized function 154 and the parameters 152 may be adjusted as needed such that the user model 144 serves as a behavioral model to predict a QoE for the user of any media program comprising any number and frequency of perceived transmission impairments of any duration. Similarly the parameterized function 154 may be adjusted to fit any scoring scheme.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A computer system comprising:
a monitoring device coupled to a network, wherein the monitoring device includes:
a memory configured to store instructions; and
at least one computer processor disposed in communication with the memory, wherein the at least one computer processor upon execution of the instructions is configured to:
monitor a media program streaming across the network to a media client for perceivable transmission impairments; and
provide a model to reflect user dissatisfaction based on types of perceivable transmission impairments and timing, duration, and frequency of perceivable transmission impairments to estimate a quality of experience of the media program, the model implements a parametric function providing a behavioral model of a user that reflects user satisfaction decreases during perceivable transmission impairments and increases frequency of perceivable transmission impairments to estimate a quality of experience of the media program, the model implements a parametric function providing a behavioral model of a user that reflects user satisfaction decreases during perceivable transmission impairments and increases during uninterrupted playback as a function of time, wherein the parameterized function comprises a piecewise function having a plurality of subfunctions and the model transitions through the plurality of subfunctions based on one or more thresholds defined by at least one parameter of a set of parameters including a cosine subfunction and linear subfunction, wherein the model further reflects a user expectation context for streaming the media program, the user expectation context comprising a duration of the media program and at least one of: a device type of the media client, a network connection type of the network; and a service type associated with the media program.

2. The system of claim 1, wherein:
the model comprises one or more parameterized functions; and
a set of parameters used in at least one of the one or more of the parameterized functions at a point in time during the streaming of the media program is based on a type of perceivable transmission impairment associated with the point in time.

3. The system of claim 2, wherein the set of parameters is further based on a user expectation context for streaming the media program, the user expectation context comprising at least one of: a device type of the media client, a network connection type of the network; a service type associated with the media program; and a duration of the media program.

4. The system of claim 1, wherein the types of perceivable transmission impairments comprise an initial buffering type and an initial rebuffering type.

5. The system of claim 4, wherein the model reflects greater user dissatisfaction due to a perceivable transmission impairment of the initial rebuffering type than a perceivable transmission impairment of the initial buffering type.

6. The system of claim 4, wherein the types of perceivable transmission impairments further comprise a subsequent rebuffering type.

* * * * *